Feb. 21, 1928.
H. A. KNOX ET AL
1,660,269
VENTILATING SYSTEM FOR VEHICLES OF THE TYPE KNOWN AS TANKS
Filed Oct. 12, 1925
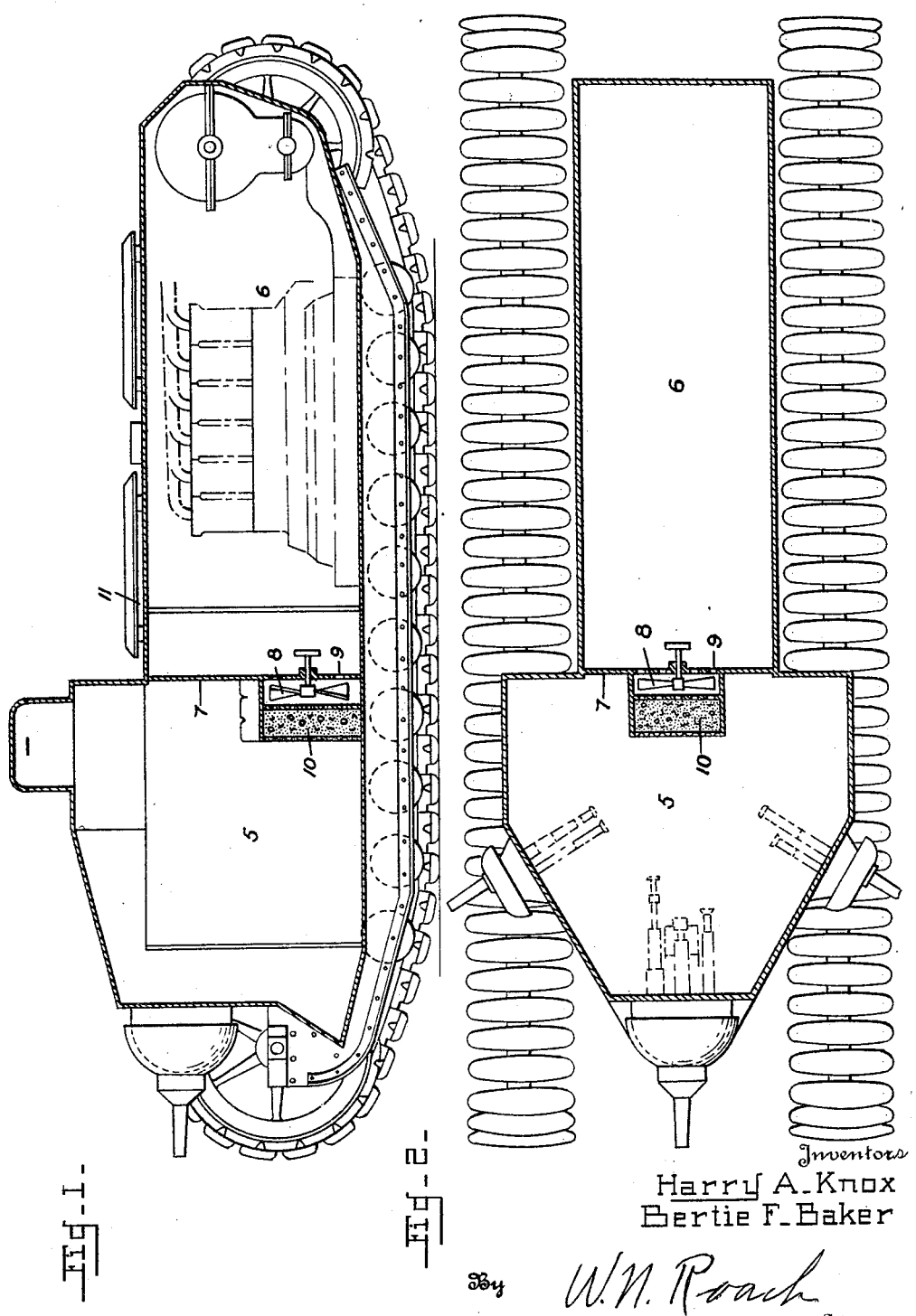
Inventors
Harry A. Knox
Bertie F. Baker
By W. N. Roach
Attorney Patented Feb. 21, 1928.

1,660,269

UNITED STATES PATENT OFFICE.

HARRY A. KNOX AND BERTIE F. BAKER, OF DAVENPORT, IOWA.

VENTILATING SYSTEM FOR VEHICLES OF THE TYPE KNOWN AS TANKS.

Application filed October 12, 1925. Serial No. 62,206.

(GRANTED UNDER THE PROVISIONS OF THE ACT OF MARCH 3, 1883, 22 STAT. L., 625.)

The invention described herein may be used by the Government, or any of its officers or employees in prosecution of work for the Government, or by any other person in the United States, without payment to us of any royalty thereon, in accordance with the act of March 3, 1883.

This invention relates to a ventilating system for vehicles of the type known as tanks. In order that vehicles of the tank type may be operated in gas infested areas and its guns kept in sustained action, it is necessary that some means be devised to protect the personnel from both the chemical and powder gases. While a ready suggestion might be to equip the personnel with the customary gas masks it is not desired to hamper their actions in such a manner because of the restricted space in the fighting compartment of the tank and the tendency by reason of such close contact to have the mask disarranged.

Inasmuch as it would be impractical to provide or rely upon a sealed compartment for excluding surrounding gases it is contemplated in the present invention to admit chemically purified air into the fighting compartment, the air to be delivered so as to maintain an internal pressure sufficiently greater than atmospheric pressure to positively insure an outward flow of the air through any small orifices or cracks in the tank body and by this means to exclude all gases from the compartment.

To these and other ends, our invention consists in the construction, arrangement, and combination of elements, described hereinafter and pointed out in the claim forming a part of this specification.

A practical embodiment of the invention is illustrated in the accompanying drawings, wherein:

Fig. 1 is a longitudinal sectional view of a tank equipped for operation according to our improved system; and Fig. 2 is a transverse sectional view thereof.

Referring to the drawings by numerals of reference:

The tank is of the usual armored type having a compartment 5 in which are stationed the personnel for manning the guns and operating the engine. This compartment is divided from the engine 6 by means of a bulk head 7.

Conveniently mounted in the tank is a fan or blower 8 driven independently or by connection with the engine and capable of delivering air under slight pressure to the fighting compartment. The air may be taken in directly from the engine compartment by providing an opening 9 in the bulk head in rear of the chemical 10 or if desired, a separate passage may lead from one of the louvres 11.

By maintaining a slight air pressure in the fighting compartment the gases surrounding the tank will be effectually excluded.

It will be understood that the invention is not limited in its application to tanks but that a ventilating system operated according to this principle may be employed in fixed emplacements and the like.

While in the foregoing there has been illustrated and described such combination and arrangement of elements, as constitute the preferred embodiment of our invention, it is nevertheless desired to emphasize the fact that interpretation of the invention should only be conclusive when made in the light of the subjoined claim.

We claim:

In a tank, a fighting compartment, an engine compartment in rear thereof having an air inlet, a bulk head separating the compartments and having an opening, a purifier in the fighting compartment in front of said opening for removing poisonous gases from the air entering the fighting compartment, and a blower for delivering air through the purifier to the fighting compartment and maintaining it under pressure in said compartment.

HARRY A. KNOX.
BERTIE F. BAKER.